United States Patent
Aasen et al.

(10) Patent No.: US 6,769,743 B1
(45) Date of Patent: Aug. 3, 2004

(54) TWO-PIECE WHEEL

(75) Inventors: Einar Johan Aasen, Oslo (NO);
Edward James Morley, Toftlund (DK);
Ole Terje Midling, Avaldsnes (NO);
Anders Sandvik, Skjold (NO)

(73) Assignee: Fundo Wheels AS, Hoyanger (NO)

( * ) Notice: Subject to any disclaimer, the term of this patent is extended or adjusted under 35 U.S.C. 154(b) by 0 days.

(21) Appl. No.: 09/051,975

(22) PCT Filed: Oct. 25, 1996

(86) PCT No.: PCT/NO96/00254
§ 371 (c)(1),
(2), (4) Date: Oct. 30, 1998

(87) PCT Pub. No.: WO97/15462
PCT Pub. Date: May 1, 1997

(30) Foreign Application Priority Data

Oct. 26, 1995 (NO) .................................................. 954273

(51) Int. Cl.⁷ .............................................. B60B 19/10
(52) U.S. Cl. ............................ 301/63.104; 301/95.104; 29/894.322
(58) Field of Search ............................... 301/65, 95.101, 301/95.104, 63.101, 64.201, 64.301, 63.103, 63.104; 29/894.3, 894.32, 894.321, 894.322, 894.35, 894.351, 894.354

(56) References Cited

U.S. PATENT DOCUMENTS

| | | | | |
|---|---|---|---|---|
| 3,787,092 A | * | 1/1974 | Weegen et al. | 301/63.1 |
| 4,610,482 A | * | 9/1986 | Overbeck et al. | 301/63.1 |
| 5,360,261 A | * | 11/1994 | Archibald et al. | 301/63.1 |
| 5,509,726 A | * | 4/1996 | Overbeck | 301/63.1 |
| 5,538,329 A | * | 7/1996 | Stach | 301/65 |
| 5,548,896 A | * | 8/1996 | Archibald et al. | 301/63.1 |
| 5,558,407 A | * | 9/1996 | Jaskiery | 301/63.1 |
| 5,564,792 A | * | 10/1996 | Archibald | 301/63.1 |
| 5,718,485 A | * | 2/1998 | Stach | 301/63.1 |
| 5,813,592 A | * | 9/1998 | Midling et al. | 228/112.1 |
| 6,024,415 A | * | 2/2000 | Stach | 301/64.2 |
| 6,045,027 A | * | 4/2000 | Rosen et al. | 228/112.1 |
| 6,045,028 A | * | 4/2000 | Martin et al. | 228/112.1 |
| 6,050,474 A | * | 4/2000 | Aota et al. | 228/112.1 |
| 6,168,067 B1 | * | 1/2001 | Waldron et al. | 228/112.1 |
| 6,170,918 B1 | * | 1/2001 | Archibald et al. | 301/63.1 |

* cited by examiner

Primary Examiner—S. Joseph Morano
(74) Attorney, Agent, or Firm—Wenderoth, Lind & Ponack L.L.P.

(57) ABSTRACT

A two-piece wheel is formed by joining a center part to a rim part by a friction stir welding. The weld joints are prepared so that at least a portion of a first circumferential weld joint is not parallel to at least a portion of a second circumferential weld joint. Thus, a cast alloy center part may be securely and efficiently attached to a wrought alloy rim part.

2 Claims, 3 Drawing Sheets

TWO-PIECE WHEEL

BACKGROUND OF THE INVENTION

The present invention relates to light weight vehicle wheels and more particularly to vehicle wheels composed of two or more separately formed parts and a method for forming the same.

Today there are mainly three types of light metal wheels on the market: a cast one-piece, a forged one-piece, and welded plate wheels. The forged and welded types have the biggest potential for low weight because of the use of wrought alloys having higher strength than casting alloys. However, casting gives a higher design freedom, without substantially influencing the cost. The design freedom does not only give styling flexibility, but also makes it possible to give the center part of the wheel a nearly optimal shape with respect to cornering strength which normally is the critical aspect for this part.

In the rim area, however, an alloy with high mechanical strength and good elongation is of primary importance. An optimal design of a wheel in order to obtain low weight and full styling freedom thus seems to be one where a cast center part is joined to a rim of wrought alloy. Such wheels are already on the market and have joints either comprising a bolted connection (being an expensive and non-low-weight solution) or a weld seam.

However, all known disclosed welding methods for wheels are based on fusion welding (e.g., arc welding) or friction welding which requires joint preparation and post weld dressing steps, which negatively influences the total manufacturing costs. Furthermore, several other negative/limiting aspects have been experienced, such as the environmental hazard connected with fusion welding, problems with dimensional stability both with fusion and friction welded wheels, and limited design freedom with regard to the need for performing multiple parallel welds compared to conventional friction welding processes.

SUMMARY OF THE INVENTION

It is therefore an object of the present invention to provide a new and improved type of two-piece wheel which avoids the above drawbacks related to the presently applied joining methods.

Another object of the present invention is to provide a new method for joining of separately formed wheel parts offering the possibility to achieve high quality weld seams.

These and other objects and advantages of the present invention will be met by the provisions of a new method of joining separately formed wheel parts and a novel automotive light metal wheel.

BRIEF DESCRIPTION OF THE DRAWINGS

The objects and advantages of the present invention will become apparent from the following detailed description of the preferred embodiments when read in light of the accompanying drawings, in which.

DETAILED DESCRIPTION OF THE DRAWINGS

Figure 1:
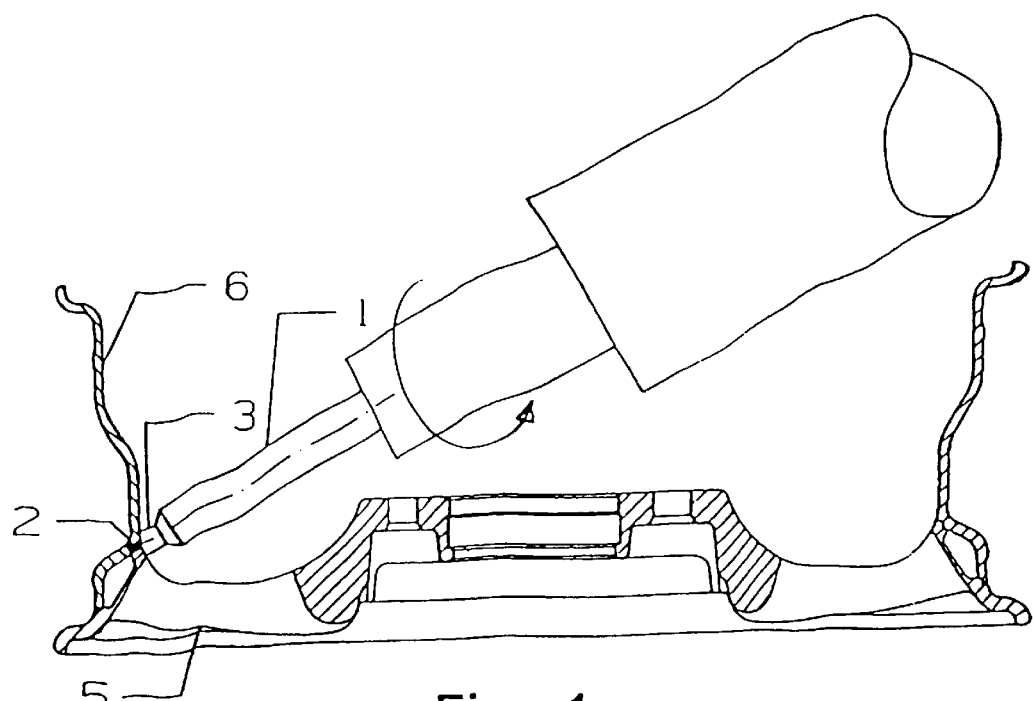
FIG. 1 is a schematic plan view showing joining (welding) of the assembled two-piece vehicle wheel.

Referring to the drawings, and particularly to FIG. 1, the principle of joining separately provided rim part 6 and center disc part 5 of a vehicle wheel by means of a rotating tool 1 is shown schematically to illustrate the application of the friction stir welding process according to the present invention.

The recently developed friction stir welding process, as disclosed in WO93/10935, joins workpieces by plasticising and then consolidating the material about their joint line. The welding is achieved by using a rotating tool 1 comprising a pin 2 and a shoulder part 3. The pin is inserted at the start of the weld joint 4 and moved forward in the direction of the welding. When the pin is rotated, the friction it produces heats annular regions of the pre-assembled workpieces, which rapidly produces a shaft of plasticised metal around the pin. As the pin is moved forward, the pressure provided by the leading face of the shoulder part 3 forces plasticised material behind the pin where it consolidates and cools to form a weld seam. Thus no heat is generated due to relative motion between the workpieces to be joined.

The pre-assembled wheel parts 5,6 can advantageously rotate during the welding process around their vertical axis of symmetry (at identical speeds and in the same direction), while the rotor tool 1 remains stationary as indicated in the figure. In this way, more than one weld seam can be achieved simultaneously using a double set of friction stir welding rotor tools.

Figure 2:
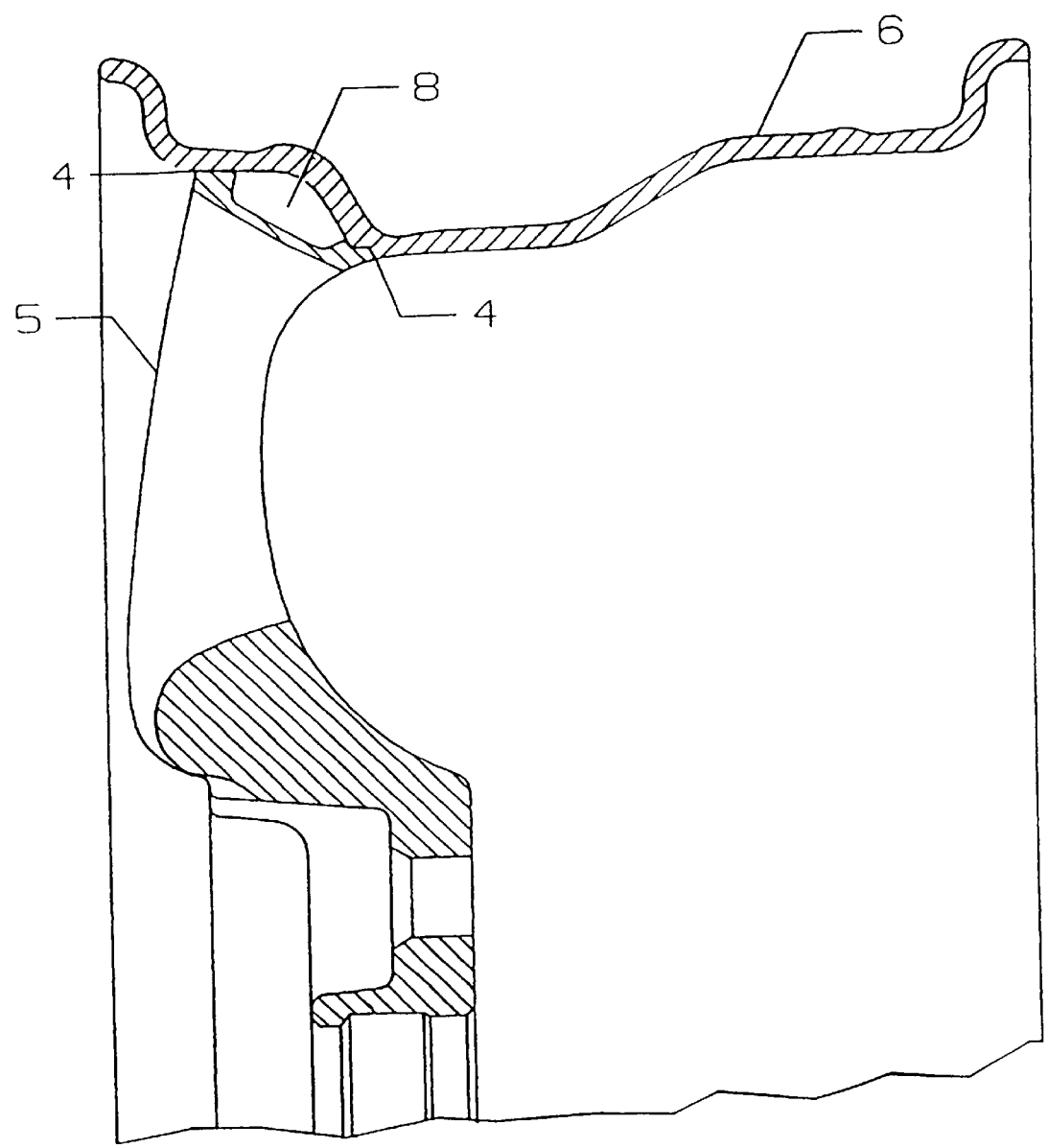
FIG. 2 is a cross-sectional partial vertical view of a vehicle wheel fabricated in accordance with the present invention.
Figure 3:
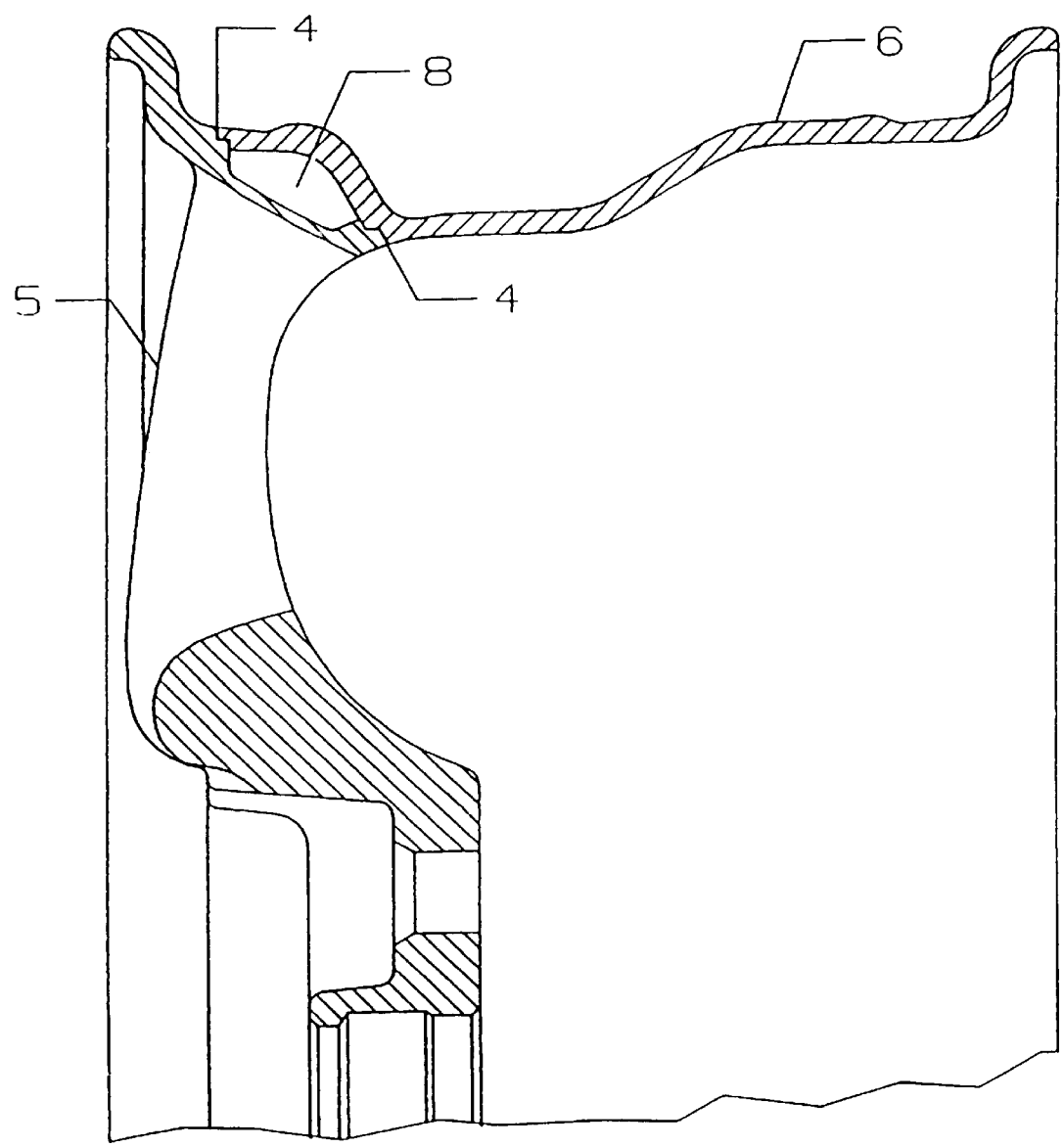
FIG. 3 is a cross-sectional partial view of a vehicle wheel exhibiting an alternative configuration of the weld seam.

Special advantages resulting from the application of the friction stir welding process for joining separately made vehicle wheel parts according to the present invention are more apparent from FIG. 2 and FIG. 3. These Figures show an optional choice of lap or butt weld joints joining a cast or forged outer flange to the center disc part.

Figure 4:
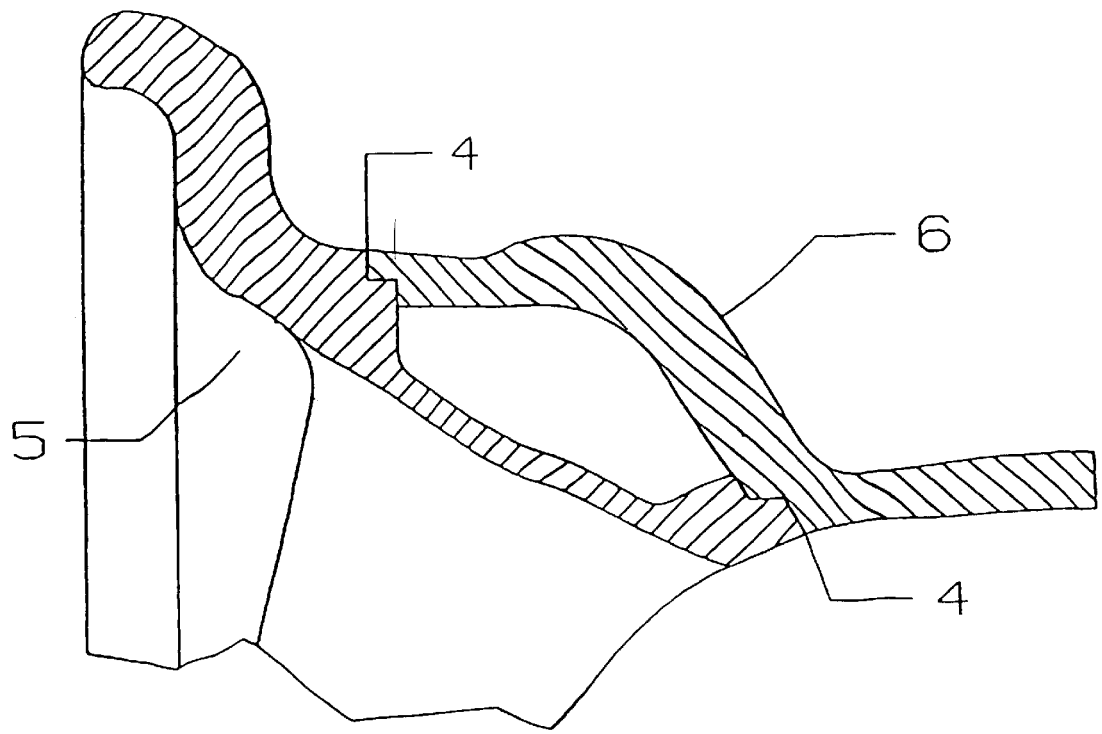
FIG. 4 is an enlarged view of a portion of FIG. 3 showing a weld joint geometry for joining the disc part to the rim part of the wheel.

The possibility of providing two or more non-parallel seams (or, at least, non-parallel portions of the joints) between the center disc part and the rim part results in superior design and wheel performance characteristics compared to the conventional friction welded two-piece wheel. For example, as clearly shown in FIG. 4, two separate non-liner weld joints 4 are formed between the rim part 6 and the center disc part 5. In the upper weld joint 4, two vertical weld joint surfaces of rim part 6 abut against two corresponding vertical weld joint surfaces of center disc part 5 so as to form two vertical joint portions 9. These portions a rejoined by a horizontal weld joint portion 10 formed by horizontal weld joint surfaces of the rim part 6 and the center disc part 5. On the contrary, lower weld joint 4 includes two inclined joint portions 11 formed by abutting inclined weld joint surfaces of rim part 6 and center disc part 5. These inclined joint portions 11 are joined by a horizontal joint portion 12. Thus, the weld joints 4 shown in FIG. 4 are formed so that at least a portion (vertical joint portion 9) of the upper weld joint is not parallel to at least a portion (inclined joint portion 11) of the lower weld joint. As a result, superior performance characteristics are achieved, and the rim part 6 and center disc part 5 can be securely fixed prior to welding.

Provision of a "branched" circumferential connection between the disc and the rim ensures a favorable load transfer through the two weld seams in a particularly stressed area of the wheel. Simultaneously, an optimal configuration of the center disc part is achieved which forms a cavity (pocket) 8 at the disc periphery, thus ensuring material and weight savings.

FIG. 4 illustrates in detail a weld joint geometry incorporating a support function for the rim part during the assembling and welding operation. Such joint design considerably facilitates the fixation process prior to the welding operation.

Welding test have demonstrated that the weld seams of the present invention exhibit good mechanical properties with a low grade of distortion due to the low heat generation during welding, which is conducted at approximately 500° C.

Fine grain structures are obtained on all tempers of aluminum alloys whether provided as cast, rolled or extruded parts. For example, by welding in a solution-treated (T4) condition of AlMgSi1 parts followed by artificial ageing (T6 treatment), a high uniformity of mechanical properties across the welds was achieved, and 90% of the original strength in the heat affected zone was maintained. These benefits were unattainable by conventional competitive welding techniques.

The possibility of combining wheel parts made of casing alloys (e.g., AlSi 11,AlSi7Mg) with parts of wrought aluminum alloys of 6000 and 7000 series is another advantageous feature achieved by using the friction stir welding process according to the present invention.

According to a preferred embodiment of the present invention, a two-piece wheel can be provided combining a center disc part and a rim part based on a centrifugally cast tube of wrought aluminum alloy which is subjected to plastic working (roll or spin forming) to the desired configuration of the rim profile prior to the weld joining of the parts. In this way, an optimal combination of material characteristics is achieved, thus reducing the danger of cracking during the plastic working of the rim.

There are several additional benefits and advantages resulting from applying friction stir welding in the manufacture of two-piece wheels. Firstly, no special preparation of the to-be welded surfaces is required, and prefinished parts which have been surface treated (powder coated or anodised) can be welded. Secondly, the welds have a good surface appearance and require no or limited post welding machining or dressing operations. Thirdly, the process is energy efficient and can be performed with inexpensive equipment. Further, good dimensional tolerances (run out) are obtained due to a low distortion, and no filler material, special operative skill or shielding atmosphere is required. In addition, there is no loss of alloying elements from the weld microstructure compared to fusion welding techniques, and the fine grained seam indicates that the wear base material fatigue properties are maintained. Finally, it is an environmentally friendly non-polluting process for manufacturing vehicle wheels.

In addition to the above examples, other configurations of wheel parts and weld joints can be used within the context of the present invention. For example, the center disc part may be provided as a forged part of a wrought Al-alloy, or the center part may be a spider type comprising a multiplicity of hollow spokes instead of the illustrated full face center disc part.

What is claimed is:

1. A method of manufacturing a two-piece wheel, comprising:

forming a center part of alloy material;

forming a rim part of alloy material; and joining the center part to the rim part by at least one circumferential weld seam, said joining comprising friction stir welding the center part to the rim part along at least one circumferential weld joint so as to form a solid-phase weld seam;

wherein said joining of the center part to the rim part by at least one circumferential weld seam further comprises holding a friction stir welding tool stationary at the weld joint and rotating the center part and the rim part about a common central axis at an identical speed and in an identical direction.

2. A method of manufacturing a two-piece wheel, comprising:

forming a center part of alloy material;

forming a rim part of alloy material;

preparing at least two circumferential weld joints on the center part and the rim part for joining the center part to the rim part, the at least two circumferential weld joints including a first weld joint and a second weld joint, the weld joints being prepared such that at least a portion of the first weld joint and at least a portion of the second weld joint are non-parallel; and joining the center disc part to the rim part by friction stir welding the center part to the rim part along the at least two circumferential weld joints so as to form at least two circumferential weld seams;

wherein said joining of the center part to the rim part by at least two circumferential weld seams further comprises holding a friction stir welding tool stationary at at least one of the weld joints and rotating the center part and the rim part about a common central axis at an identical speed and in an identical direction.

* * * * *